March 1, 1949.  E. C. HOKANSON  2,463,383
ENGINE WORKSTAND
Filed Jan. 14, 1944  2 Sheets-Sheet 1
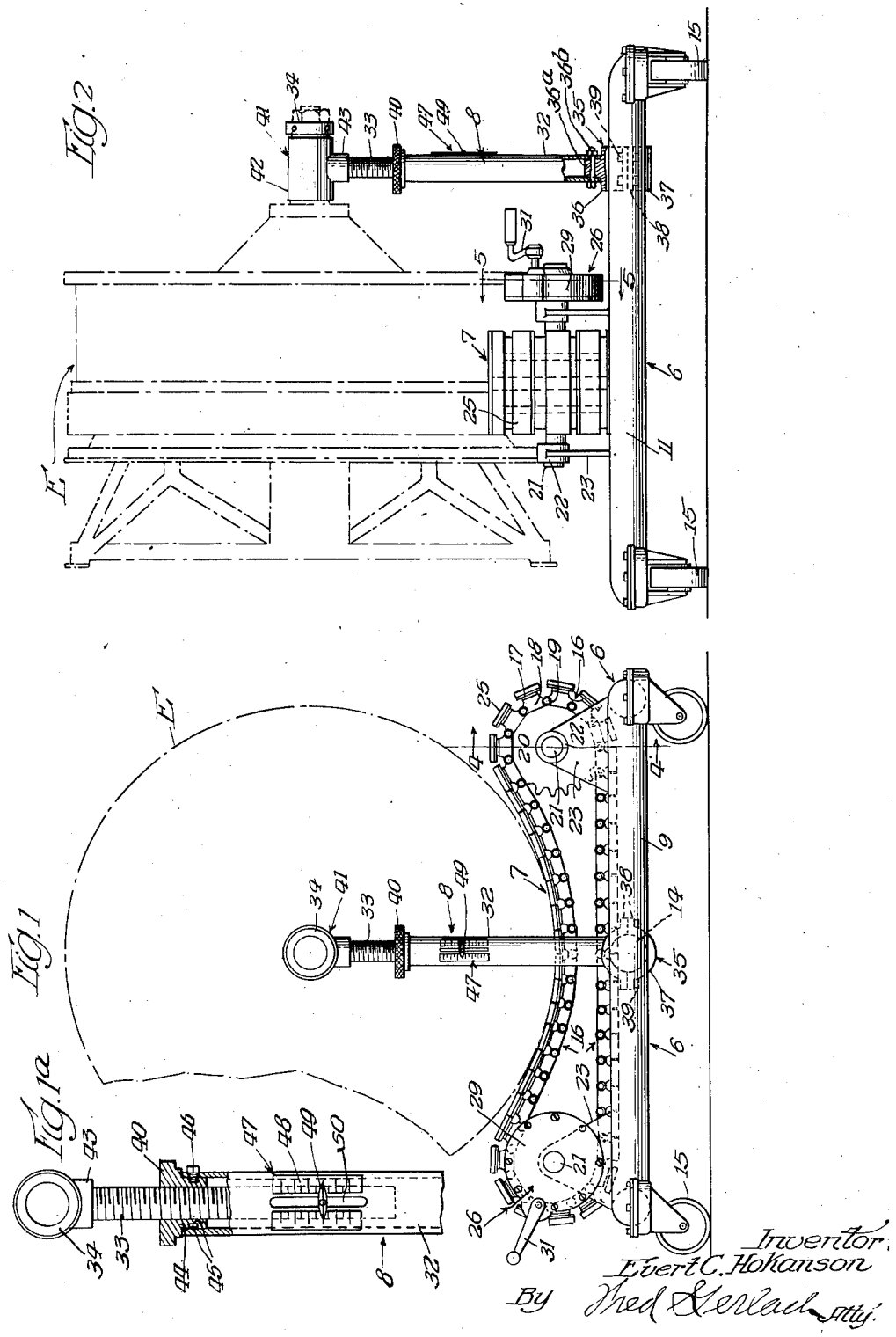
Inventor
Evert C. Hokanson
By Fred Gerlach, Atty.

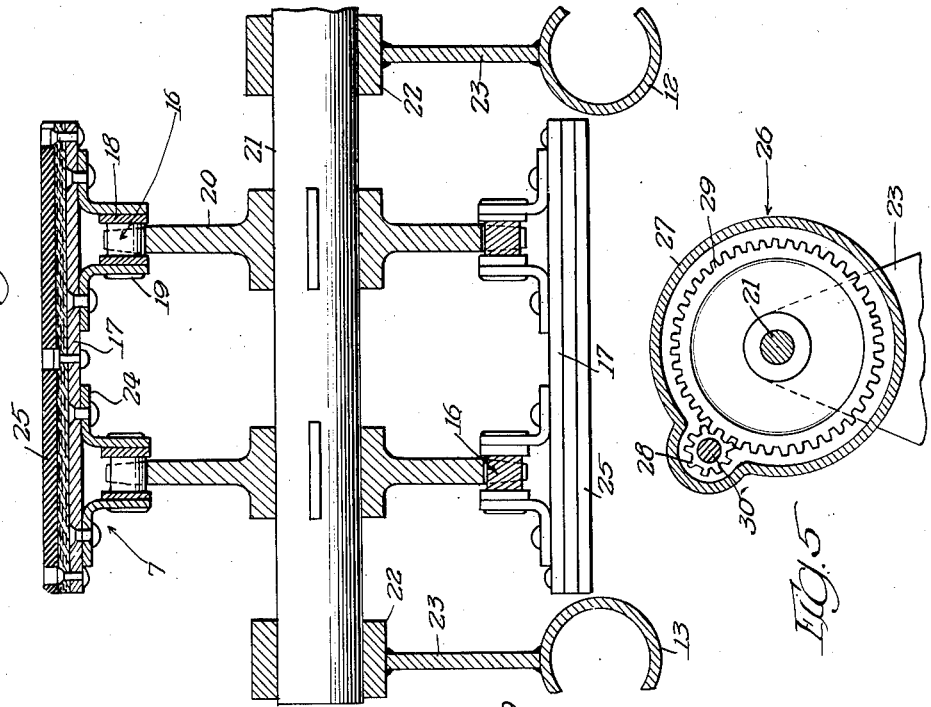
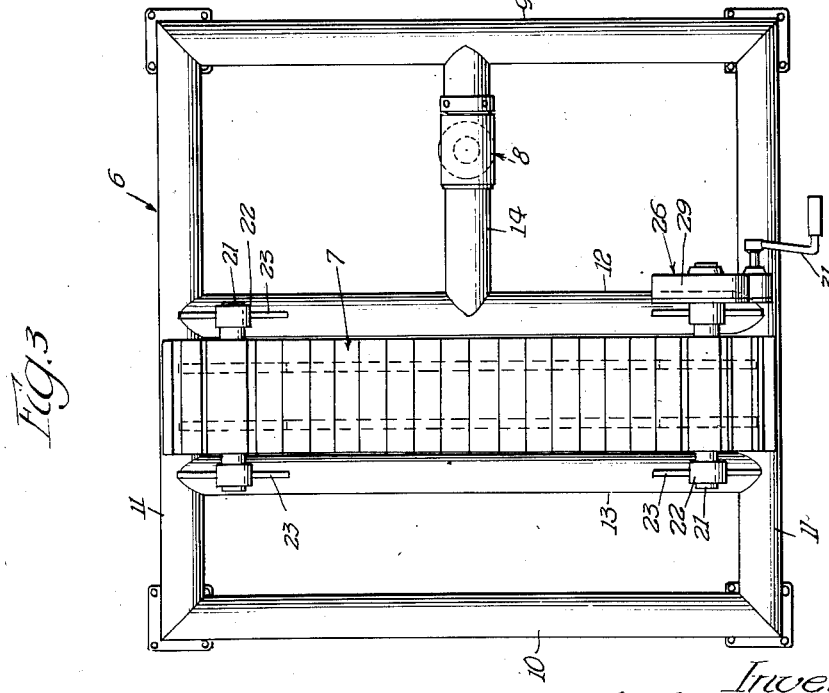

Patented Mar. 1, 1949

2,463,383

UNITED STATES PATENT OFFICE 2,463,383

ENGINE WORK STAND

Evert C. Hokanson, Grand Rapids, Mich., assignor to Whiting Corporation, Harvey, Ill., a corporation of Illinois Application January 14, 1944, Serial No. 518,293

2 Claims. (Cl. 29—289)

The present invention relates generally to workstands for supporting internal combustion engines during installation thereon, or removal therefrom, of auxiliary equipment, such, for example, as engine mounts, generators, starters, carburetors, magnetos, pumps, and fuel and oil lines. More particularly the invention relates to that type of engine workstand which is designed primarily for use in supporting or handling radial variety aircraft engines and embodies a horizontal caster equipped base frame and an engine supporting member on the base frame together with an upstanding strut which is mounted in opposed relation with the engine supporting member and is provided at its upper end with a bearing for receiving and supporting the exposed end of the drive shaft of the engine that is supported by way of the workstand.

One object of the invention is to provide an engine workstand of this type which is an improvement upon, and has certain advantages over, previously designed workstands including that which is disclosed in, and forms the subject matter of, United States Letters Patent No. 2,329,613, granted on September 14, 1943.

Another object of the invention is to provide an engine workstand which is capable of supporting or handling engines of various sizes without the necessity of employing extra parts and is characterized by the fact that the engine supporting member is in the form of a horizontally elongated endless carrier which is supported at its ends by rotatable elements on the base frame and is adapted to have the engine rest on its upper reach.

A further object of the invention is to provide an engine workstand of the type and character last mentioned in which provision is made for driving the endless carrier in order to effect rotation or angular displacement of the engine while it is in place on the workstand.

A still further object of the invention is to provide an engine workstand which is generally of new and improved construction, may be produced at a comparatively low cost, and includes a novel form or type of upstanding strut.

Other objects of the invention and the various advantages and characteristics of the present engine workstand will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a front view of an engine workstand embodying the invention;

Figure 1ª is an enlarged side view of the upper end of the strut, parts being broken away and other parts being shown in section for illustrative purposes;

Figure 2 is an end view;

Figure 3 is a plan view;

Figure 4 is an enlarged vertical section taken on the line 4—4 of Figure 1 and illustrating in detail the construction and design of the endless carrier constituting the engine supporting member of the workstand; and Figure 5 is a vertical section taken on the line 5—5 of Figure 2 and showing the gearing for driving the endless carrier when it is desired to rotate or angularly displace the engine on the workstand.

The workstand which is shown in the drawings constitutes the preferred form or embodiment of the invention. It is portable and serves as a medium or means for supporting a radial engine E during installation thereon, or removal therefrom, of auxiliary equipment. The engine E is outlined by dotted or broken lines in Figures 1 and 2 of the drawings. It is of the airplane type and comprises in addition to a crank case, an annular series of radially extending cylinders, rocker boxes at the outer ends of the cylinders and a drive or crank shaft. One end of the crank shaft projects outwards of the crank case and is adapted to have a propeller mounted thereon. Preparatory to installation of the engine E on the airplane for which it is designed or selected it is necessary to mount on the engine the auxiliary equipment including the mounting structure or supporting means and the various engine accessories, such as the generator, starter, carburetor, magneto, pumps and fuel and oil lines. The present workstand serves as a medium for retaining the engine in an upright position wherein the drive shaft extends horizontally and enables the person or worker operating on the engine to install the auxiliary equipment and engine accessories while assuming a standing or upright position. It also serves as a retaining or supporting medium when it is desired to dismantle or remove such equipment and accessories from the engine. As its principal parts the workstand comprises a horizontal base frame 6, an engine supporting member 7 and an upstanding strut 8.

The base frame 6 is rectangular and comprises a front member 9, a back member 10, a pair of side members 11 and three intermediate members 12, 13 and 14. Such members are preferably formed of steel tubing or pipe. The front and rear members 9 and 10 of the base frame are disposed in parallel relation and are equal in length. The side members 11 are disposed in parallel relation and have the ends thereof welded or otherwise fixedly secured to the ends of the front and back members. The intermediate members 12 and 13 are arranged in parallel relation with the front and back members and have the ends thereof secured to the side members of the base frame. They are spaced apart as shown in Figure 3. The intermediate member 12 is preferably disposed midway between the front and back members and the member 13 is positioned midway between the member 12 and the back member 10. The intermediate members 14 serves as a support for the strut 8 and is disposed in parallel relation with, and midway between, the side members 11. The front end of the intermediate member 14 is connected to the central portion of the front member 9 and the rear end is connected to the central portion of the intermediate member 12. The corners of the base frame are provided with depending swivel type casters 15 and these support the base frame in an elevated position with respect to the subjacent floor or supporting surface and permit the workstand as a whole to be shifted bodily from place to place.

The engine supporting member 7 is in the form of a horizontal endless carrier and comprises a pair of laterally spaced endless chains 16 and a series of crossplates 17. The chains consist of links 18 and pivot pins 19 and are disposed over, and in parallel relation with, the intermediate members 12 and 13 of the base frame 6. They are the same in length and are supported at their ends by way of sprocket wheels 20. The latter are four in number and are arranged in pairs, there being one pair of sprocket wheels adjacent each side member 11 of the base frame. The pairs of sprocket wheels are mounted on a pair of horizontally extending shafts 21 which extend in parallel relation with the side members of the base frame and have the ends thereof journalled in bearings 22 on the upper ends of brackets 23. The brackets are connected to, and project upwards from, the ends of the intermediate members 12 and 13 of the base frame. The links 18 of the chains 16 are provided with outwardly extending integral lugs 24. The crossplates 17 serve to cross connect the two chains and are riveted to the lugs 24 on the links 18 of the chains. Pads 25 of vulcanized rubber or like resilient material are secured to the outer faces of the crossplates 17. The upper reach of the endless carrier is adapted to support the engine as shown in the drawings. Preferably the chains are of such length that the upper reach of the carrier sags and assumes an arcuate form. When the engine is mounted in place on the workstand the upper reach of the endless carrier engages the rocker boxes of the lower cylinders of the engine E. Because of the character of the carrier constituting the engine supporting member 7 the carrier is capable of supporting engines of different diameters.

In addition to the parts heretofore mentioned the workstand comprises a gear unit 26 for driving the endless carrier when it is desired to turn or angularly displace the engine E while the latter is on the workstand. This unit comprises a housing 27, a pinion 28 and a gear 29. The housing is mounted on one of the bearings 22 and serves as an enclosure for the pinion and gear. The pinion is mounted on a horizontal shaft 30 which is suitably journalled in the housing and has one end thereof projecting through the housing and provided with a crank 31 for turning purposes. The gear 29 is in mesh with the pinion 28 and is keyed or otherwise fixedly secured to one of the shafts 21. When the crank 31 is turned in one direction the endless carrier is driven in one direction and effects rotation or angular displacement of the engine E. Turning of the crank in the opposite direction results in reverse drive of the endless carrier. By turning the crank 31 in one direction or the other the endless carrier may be driven so as to turn or rotate the engine.

The strut comprises a vertically extending tubular lower part 32, a vertically extending upper part 33 and a cylindrical bearing 34. The lower end of the tubular lower part 32 is removably connected to a split cylindrical clamp 35 and this surrounds, and is longitudinally adjustable on, the intermediate member 14 of the base frame 6. As shown in Figure 2 of the drawings the clamp 25 comprises an upper semi-cylindrical section 36 and a lower semi-cylindrical section 37 and these embody outwardly extending lugs 38 and are clamped together by way of bolts 39 which extend through the lugs. When the bolts are tightened the strut 8 is maintained in fixed relation with the intermediate member 14 and the engine supporting member 7. By loosening the bolts the strut may be adjusted longitudinally of the intermediate member 14, i. e., to and from the engine supporting member. The upper section 36 of the split clamp 35 is provided with an upwardly extending strut shaft 36$^a$ and this fits snugly within the lower end of the tubular part 32. A bolt 36$^b$ extends through registered or aligned holes in the strut shaft and said lower end of the tubular lower part 32 and serves releasably to connect the two. By removing the bolt the strut 8 may be removed. The vertically extending upper part 33 of the strut is in the form of a screw shaft and fits slidably in the lower part 32. A nut 40 is mounted on the upper strut part 33 and rests on the upper end of the lower strut part 32. By turning this nut in one direction or other while the upper strut part 33 is held against rotation relatively to the lower strut part 32 the upper strut part may be raised or lowered. The upper end of the upper part of the strut is provided with a T fitting 41 consisting of a cylindrical horizontal branch 42 and a depending branch 43. The last mentioned branch surrounds, and is fixedly secured to, the upper end of the upper strut part 33. The bearing 34 is slidably mounted in the horizontal branch 42 of the T fitting 41 and is adapted to receive the outer or exposed end of the drive shaft of the engine E. It is suitably held against axial displacement with respect to the horizontal branch 42 of the T fitting and serves when the exposed end of the drive shaft of the engine is mounted therein, to hold the engine against fore and aft tilting with respect to the engine supporting member 7. Because the strut 8 is extensible and also adjustable to and from the engine supporting member 7 the workstand is capable of handling engines that vary in diameter. The nut 40 is provided with a tubular, depending, internally threaded extension 44 which fits rotatably in the upper end of the tubular lower part 32 of the strut and embodies an annular groove 45 in its outer periphery. A cap screw 46 extends through an internally threaded hole in the upper end of the lower strut part 32 and is arranged so that the inner end thereof extends into the annular groove 45. The cap screw and groove serve to hold the nut in connected relation with the lower strut part 32 while at the same time permitting the nut to rotate relatively to said strut part.

A gauge 47 serves to indicate the height of the shaft receiving bearing 34 with respect to the base frame 6. Such gauge comprises a pair of indicator plates 48 and a pointer 49. The indicator plates are vertically elongated and have scales or graduations to indicate different engine diameters. They are spaced laterally apart and are attached in any suitable manner to the upper central portion of the lower strut part 32. The pointer 49 is connected to, and projects laterally from, the lower end of the upper strut part 33 and extends through, and is vertically slidable in, a slot 50. The latter is formed in the upper central portion of the lower strut part 32 and is disposed between the indicator plates 48. The pointer 49 is adapted to coact with the scales or graduations on the indicator plates. By utilizing the gauge 47 in connection with turning of the nut 40 the cylindrical shaft receiving bearing 34 may be set or adjusted to receive the shaft of an engine of any particular diameter.

When it is desired to use the workstand as a medium for supporting the engine E in connection with application or removal of auxiliary equipment the workstand is shifted under the engine while the latter is supported from an overhead crane or other instrumentality. Thereafter the strut 8 is adjusted so that the cylindrical bearing 34 is positioned from the upper reach of the supporting member 7 a distance corresponding to the radius of the engine. Adjustment of the strut is effected by turning the nut 40. After adjustment of the strut the bolt 36$^b$ is withdrawn and the strut is removed and the bearing is slid onto the exposed end of the drive shaft of the engine E. After mounting of the bearing on the exposed end of the engine drive shaft the engine is lowered until it rests upon the upper reach of the supporting member 7. During lowering of the engine the lower end of the lower strut part 32 is slid onto the upwardly extending stub shaft 36$^a$ so as to connect the strut to the base frame 6. As soon as the lower end of the lower strut part 32 is in sleeved relation with the stub shaft 36$^a$ the bolt 36$^b$ is inserted into place in order readily to connect the lower strut part 32 to the split cylindrical clamp 35. When the engine is mounted in place it is held by the strut against fore and aft tilting. Rotation or turning of the engine is effected by turning the crank 31 as hereinbefore described.

The herein described workstand is essentially simple in design and construction and hence may be manufactured at a low and reasonable cost. It is both compact and rugged and effectively and efficiently fulfills its intended purpose. By reason of the fact that the base frame 6 is provided with casters the workstand is portable and hence may be shifted or moved from place to place. Because the workstand includes an endless carrier type engine supporting member and the extensible and laterally adjustable strut 8 it is capable of supporting or handling engines of various sizes without necessitating or employing extra parts.

Whereas the workstand has been described as being adapted for use in connection with radial engines of the airplane type it is to be understood that it may be used in connection with other engines. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A workstand adapted to support an internal combustion engine with radial cylinders and a drive shaft with an exposed end, and comprising a horizontal base frame embodying four rectangularly arranged and connected together outer members, a pair of parallel, spaced apart, intermediate members extending between and connected to two opposed outer members and provided at the ends thereof with upstanding bearing equipped brackets, and a third intermediate member extending between and at right angles to one of the pair of intermediate members and the adjacent one of the two other outer members and connected to the central portions thereof, a pair of horizontal, spaced apart shafts having the ends thereof journalled in the bearings on the brackets, pairs of axially spaced apart sprocket wheels mounted, respectively, on the central portions of the shafts, a flexible endless horizontally disposed carrier embodying a pair of side by side endless chains extending lengthwise of the pair of intermediate members and trained around and supported by the sprocket wheels, and a series of crossplates extending between, and serving to cross connect, the links of the chains, said carrier having its upper reach free or unobstructed and designed to support the engine in an upright or vertical position and being adapted when driven to turn the engine about the axis of the drive shaft, and an upstanding vertically extending strut having the lower end thereof mounted on the third intermediate member so that the strut as a whole is bodily adjustable to and from the carrier and having its upper end provided with a bearing for receiving and rotatably supporting said exposed end of the engine drive shaft.

2. A portable workstand adapted to support an internal combustion engine with radial cylinders and a drive shaft with an exposed end, and comprising a horizontal, caster-equipped base frame embodying four rectangularly arranged and connected together outer members, a pair of parallel, spaced apart intermediate members extending between and connected to two opposed outer members and provided at the ends thereof with upstanding bearing equipped brackets, and a third intermediate member extending between and at right angles to one of the pair of intermediate members and the adjacent one of the two other outer members and connected to the central portions thereof, a pair of horizontal, spaced apart shafts having the ends thereof journalled in the bearings on the brackets, pairs of axially spaced apart sprocket wheels mounted, respectively, on the central position of the shafts, a flexible endless horizontally disposed carrier embodying a pair of side by side endless chains extending lengthwise of the pair of intermediate members and trained around and supported by the sprocket wheels, and a series of crossplates extending between, and serving to cross connect, the links of the chains, said carrier having its upper reach free or unobstructed and designed to support the engine in an upright or vertical position and being adapted when driven to turn the engine about the axis of the drive shaft, means for manually driving the carrier including gearing mounted on one of said bearings and applied to the adjacent shaft and a crank operatively connected to one of the gears of said gearing, and an upstanding vertically extensible strut having the lower end thereof mounted on said third intermediate member of the base frame so that the strut as a whole is bodily adjustable to and from the carrier and having its upper end provided with means for receiving and rotatably supporting said exposed end of the engine drive shaft.

EVERT C. HOKANSON.

REFERENCES CITED

The following references are of record in the file of this patent:

UNITED STATES PATENTS

| Number | Name | Date |
|---|---|---|
| 799,837 | Dittbenner | Sept. 19, 1905 |
| 999,982 | Fraser | Aug. 8, 1911 |
| 1,131,027 | Arnholm | Mar. 9, 1915 |
| 1,431,939 | Eaton | Oct. 17, 1922 |
| 1,783,187 | Elliott | Dec. 2, 1930 |
| 1,905,307 | Kirkwood | Apr. 25, 1933 |
| 2,329,613 | Hokanson et al. | Sept. 14, 1943 |
| 2,409,468 | Bock | Oct. 15, 1946 |